US012339117B2

(12) United States Patent
Ren et al.

(10) Patent No.: US 12,339,117 B2
(45) Date of Patent: Jun. 24, 2025

(54) SYSTEM AND METHOD FOR DETECTING FULL-LENGTH FLUCTUATION STATE OF SCRAPER CONVEYOR OF FULLY-MECHANIZED COAL MINING WORKING FACE

(71) Applicant: TIANDI SCIENCE & TECHNOLOGY CO., LTD., Beijing (CN)

(72) Inventors: Huaiwei Ren, Beijing (CN); Shixin Gong, Beijing (CN); Ying Ma, Beijing (CN); Jie Zhou, Beijing (CN); Yibo Du, Beijing (CN); Zhiguo Wen, Beijing (CN); Guorui Zhao, Beijing (CN); Zhe Han, Beijing (CN); Ming Du, Beijing (CN); Shuaishuai Li, Beijing (CN)

(73) Assignee: TIANDI SCIENCE & TECHNOLOGY CO., LTD., Beijing (CN)

( * ) Notice: Subject to any disclaimer, the term of this patent is extended or adjusted under 35 U.S.C. 154(b) by 217 days.

(21) Appl. No.: 18/041,777

(22) PCT Filed: Jun. 1, 2021

(86) PCT No.: PCT/CN2021/097777
§ 371 (c)(1),
(2) Date: Feb. 15, 2023

(87) PCT Pub. No.: WO2022/048215
PCT Pub. Date: Mar. 10, 2022

(65) Prior Publication Data
US 2023/0296376 A1 Sep. 21, 2023

(30) Foreign Application Priority Data
Sep. 4, 2020 (CN) .......................... 202010919991.9

(51) Int. Cl.
E21F 13/06 (2006.01)
G01B 21/22 (2006.01)

(52) U.S. Cl.
CPC ............ G01B 21/22 (2013.01); E21F 13/066 (2013.01)

(58) Field of Classification Search
CPC ....... E21F 13/06; E21F 13/066; E21F 13/068; G01B 21/22
See application file for complete search history.

(56) References Cited

U.S. PATENT DOCUMENTS 3,367,717 A * 2/1968 Rosler .................. E21F 13/068
198/519
10,982,541 B2 * 4/2021 Davis ..................... E21C 35/08
(Continued)

FOREIGN PATENT DOCUMENTS

CN 109018851 A 12/2018
CN 109736868 A 5/2019
(Continued)

Primary Examiner — Benjamin F Fiorello
(74) Attorney, Agent, or Firm — Frank Gao, Esq.

(57) ABSTRACT

The invention discloses a system and a method for detecting a full-length fluctuation state of a scraper conveyor in a fully-mechanized coal mining working face. The detection system consists of a proximity switch trigger module of the hydraulic support base, a displacement detection module of the digital oil cylinder for position and attitude regulation of the single-section scraper conveyor, a calculation module for the fluctuation angle of the middle groove of the single-section scraper conveyor and a full-length fluctuation state output module of the scraper conveyor. Detect the elevation angle α of the push rod of the hydraulic support through the proximity switch trigger module of the hydraulic support base, detect the telescopic amount of the piston rod of the digital oil cylinder for position and attitude regulation of the single-section scraper conveyor through the displacement
(Continued)

detection module of the digital oil cylinder for position and attitude regulation of the single-section scraper conveyor, the calculation module for the fluctuation angle of the middle groove of the single-section scraper conveyor calculates a fluctuation angle of the middle groove of the single-section scraper conveyor; and finally, the output module of the full-length fluctuation state of the scraper conveyor draws a full-length fluctuation curve of the scraper conveyor of the entire working face. The dynamic fluctuation change of a scraper conveyor in the vertical direction of a working face can be effectively monitored, providing a data foundation for subsequent adjustment of a fluctuation degree of the scraper conveyor.

8 Claims, 2 Drawing Sheets

(56) References Cited

U.S. PATENT DOCUMENTS

| | | | |
|---|---|---|---|
| 11,167,941 B2* | 11/2021 | Byrne | G01G 19/52 |
| 2017/0275993 A1* | 9/2017 | Rimmington | E21F 13/06 |
| 2020/0199829 A1* | 6/2020 | Avans | E01C 23/127 |
| 2022/0144554 A1* | 5/2022 | Xu | G01B 11/24 |

FOREIGN PATENT DOCUMENTS

| | | |
|---|---|---|
| CN | 110057324 A | 7/2019 |
| CN | 210456360 U | 5/2020 |
| CN | 112066936 A | 12/2020 |

* cited by examiner

SYSTEM AND METHOD FOR DETECTING FULL-LENGTH FLUCTUATION STATE OF SCRAPER CONVEYOR OF FULLY-MECHANIZED COAL MINING WORKING FACE

This application claims the priority of the Chinese patent application filed in the China Patent Office on Sep. 4, 2020, with the application number of 202010919991.9 and the invention title "A system and method for detecting full-length fluctuation state of a scraper conveyor in a fully mechanized mining face", the entire contents of which are incorporated herein by reference.

TECHNICAL FIELD

The invention relates to the technical field of coal mining, in particular to a system and method for detecting full-length fluctuation state of a scraper conveyor in a fully mechanized mining face.

BACKGROUND TECHNOLOGY

Scraper conveyor is an important supporting equipment for fully-mechanized mining face. The middle grooves of adjacent single-section scraper conveyors are connected by dumbbell pins to form an integral equipment with a certain degree of curvature, which not only can continuously transport the coal at the tail of the fully mechanized mining face to the head and unload, but also is the running track of the coal mining machine. Therefore, the continuous operation of the scraper conveyor is the premise to ensure the normal production of the fully mechanized mining face. However, during the exploitation process of the fully mechanized mining face, due to various reasons such as the overall curvature of the scraper conveyor is limited by the structure, the fluctuation of the coal seam in the underground stope, and the deformation of the coal pile at the bottom of the working face, the scraper conveyor sometimes appears "floating", that is, the scraper conveyor that should be perpendicular to the bottom of the working face has an upward deflection angle, especially the head and tail of the scraper conveyor. The phenomenon of "floating" is often seen, which causes the change of overlapping distance between the scraper conveyor and the reversed loader, results in problems such as poor coal pulling, coal pulling back or insufficient safety exit; at the same time, the "floating" of the single-section scraper conveyor causes the entire scraper conveyor in the working face to show a undulating situation, which seriously affects the "three-straight" state, that is, the scraper is straight, the coal wall is straight and the support is straight, of the scraper in the working face, and will bring huge hidden dangers to safety production.

Therefore, in order to realize the detection of the full-length fluctuation state of the scraper conveyor in the fully mechanized mining face, and lay the foundation for the regulation of the straight state of the scraper conveyor, it is necessary to provide a system and method for detecting the full-length fluctuation state of the scraper conveyor in the fully mechanized mining face.

SUMMARY OF THE INVENTION

Aiming at the lack of detection system and detection method for the full-length fluctuation state of the scraper conveyor in the fully mechanized mining face, the present invention provides a system and method for detecting the full-length fluctuation state of the scraper conveyor in the fully mechanized mining face, which can be used in a low-cost, efficient and real-time measurement of the full-length fluctuation state of the scraper conveyor, so as to obtain the fluctuation state of the working face, which provides important data support for the subsequent improvement of the straightness of the working face and the adjustment of the propulsion pitch angle of the working face.

In the first aspect, the system for detecting full-length fluctuation state of a scraper conveyor in a fully mechanized mining face according to the embodiment of the present invention includes: a proximity switch trigger module of the hydraulic support's base, a displacement detection module of the digital oil cylinder for position and attitude regulation of the single-section scraper conveyor, a calculation module for the fluctuation angle of the middle groove of the single-section scraper conveyor and an output module of the full-length fluctuation state of the scraper conveyor;

The proximity switch trigger module of the hydraulic support's base includes a proximity switch of the hydraulic support's base and a trigger device, and is used to detect the elevation angle of the push rod of the hydraulic support;

The displacement detection module of the digital oil cylinder for position and attitude regulation of the single-section scraper conveyor includes a digital oil cylinder for position and attitude regulation of the single-section scraper conveyor and its internal piston rod detection device, and is used to detect the telescopic amount of the piston rod of the digital oil cylinder for position and attitude regulation of the single-section scraper conveyor;

The calculation module for the fluctuation angle of the middle groove of the single-section scraper conveyor calculates the fluctuation angle of the middle groove of the single-section scraper conveyor by using the displacement detection value of the digital oil cylinder for position and attitude regulation of the single-section scraper conveyor and the elevation angle of the push rod of the hydraulic support;

The full-length fluctuation state output module of the scraper conveyor draws the full-length fluctuation curve of the scraper conveyor in the entire working face according to the obtained fluctuation angle of the middle groove of the single-section scraper conveyor, and outputs it to the display for display.

Preferably, the proximity switch trigger module of the hydraulic support's base is used to detect the elevation angle of the push rod of the hydraulic support, specifically: the proximity switch trigger module of the hydraulic support's base includes a proximity switch of the hydraulic support's base and an internal trigger device, installed inside the hydraulic support's base, at a certain position above when the push rod of the hydraulic support is horizontal; one end of the push rod of the hydraulic support is connected to the middle groove of the single-section scraper conveyor, and the other end is connected with the piston rod of the hydraulic support's push jack; when the push rod of the hydraulic support is displaced upward due to the force of the middle groove of the single-section scraper conveyor, after the push rod of the hydraulic support is moved upward to the proximity switch of the hydraulic support's base, the trigger device generates a pulse, and at this time, the push rod of the hydraulic support is stuck by the proximity switch and will not continue to shift upward; therefore, the elevation angle of the push rod of the hydraulic support depends on whether the push rod of the hydraulic support is shifted upward to the proximity switch of the hydraulic support's base;

Denote the distance between the proximity switch of the hydraulic support's base and the push rod of the hydraulic support when the push rod of the hydraulic support is horizontal is h, the distance between the plane where the proximity switch of the hydraulic support's base is located and the plane where the connection point of the push rod of the hydraulic support and the hydraulic support's push jack is located is s, and the elevation angle of the push rod of the hydraulic support can be determined according to whether the push rod of the hydraulic support is shifted upward to the proximity switch of the hydraulic support's base, that is, when the push rod of the hydraulic support is shifted upward to the proximity switch of the hydraulic support's base, the elevation angle of the push rod of the hydraulic support is $$\alpha = \alpha_{max} = acr\tan\left(\frac{h}{s}\right);$$

When the push rod of the hydraulic support is shifted upward and does not reach the proximity switch of the hydraulic support's base or is not shifted upward, the elevation angle of the push rod of the hydraulic support is $=0°$.

Preferably, the proximity switch trigger module of the hydraulic support's base includes a proximity switch of the hydraulic support's base and an internal trigger device, and is installed inside the hydraulic support's base at a certain position above when the push rod of the hydraulic support is horizontal; One end of the push rod of the hydraulic support is connected to the middle groove of the single-section scraper conveyor, and the other end is connected to the piston rod of the hydraulic support's push jack; when the push rod of the hydraulic support is displaced upward due to the force of the middle groove of the single-section scraper conveyor, after it is shifted upward to the proximity switch of the hydraulic support's base, the internal trigger device generates a pulse signal, and at this time, the push rod of the hydraulic support is stuck by the proximity switch and will not continue to shift upward; Therefore, the elevation angle of the push rod of the hydraulic support can be approximately determined according to whether the push rod of the hydraulic support is shifted upward to the proximity switch of the hydraulic support's base;

Assuming that the push rod of the hydraulic support is horizontal, the distance between the proximity switch of the hydraulic support's base and the push rod of the hydraulic support is h, the distance between the vertical plane where the proximity switch of the hydraulic support's base is located and the vertical plane where the connection point of the push rod of the hydraulic support and the hydraulic support's push jack is located is s, then the maximum value of the elevation angle of the push rod of the hydraulic support is:

$$\alpha_{max} = acr\tan\left(\frac{h}{s}\right) \quad (1)$$

The elevation angle $\alpha$ of the push rod of the hydraulic support can be determined according to whether the push rod of the hydraulic support is shifted upward to the proximity switch of the hydraulic support's base, that is, when the push rod of the hydraulic support is shifted upward to the hydraulic support's base, the elevation angle of the push rod of the hydraulic support is $\alpha = \alpha_{max}$. When the push rod of the hydraulic support is shifted upward and does not reach the proximity switch of the base of the hydraulic support or is not shifted upward, the elevation angle of the hydraulic support push rod is $\alpha = 0°$.

Preferably, the calculation module for the fluctuation angle of the middle groove of the single-section scraper conveyor, using the displacement detection value of the digital oil cylinder for position and attitude regulation of the single-section scraper conveyor, indirectly obtains the undulating angle of the middle groove of the single-section scraper conveyor relative to the horizontal plane where the push rod of the hydraulic support is located by using the triangular cosine theorem formula.

Preferably, the fluctuation angle of the single-section scraper conveyor can be obtained indirectly by using the triangular cosine theorem formula.

Preferably, the determination of the triangle: one end of the digital oil cylinder for position and attitude regulation of the single-section scraper conveyor is welded and fixed to the middle groove of the single-section scraper conveyor, which is briefly described as the oil-groove fixing point, and the other end is welded and fixed to the push rod of the hydraulic support connected to the single-section scraper conveyor, which is briefly described as an oil-rod fixing point, and the middle groove connection of the single-section scraper conveyor is hinged and fixed with the push rod of the hydraulic support, which is briefly described as the groove-rod fixing point; thus, the oil-groove fixing point, the oil-rod fixing point, the groove-rod fixing point, the length of the push rod of the digital oil cylinder for position and attitude regulation of the single-section scraper conveyor, the length of the middle groove between the oil-groove fixing point and the groove-rod fixing point, and the length of the push rod of the hydraulic support between the oil-rod fixing point and the groove-rod fixing point, form a triangle;

One side of the triangle is the length of the push rod of the digital oil cylinder for position and attitude regulation of the single-section scraper conveyor, and the length can be changed; the elevation angle of the middle groove of the single-section scraper conveyor relative to the horizontal plane where the push rod of the hydraulic support is located is $$\theta = 90° - \theta' = 90° - acr\cos\left(\frac{y^2 + z^2 - x^2}{2yz}\right).$$

Preferably, the determination of the triangle: one end of the digital oil cylinder for position and attitude regulation of the single-section scraper conveyor is welded and fixed to the middle groove of the single-section scraper conveyor, and the connection point is briefly described as the oil-groove fixing point, and the other end is welded and fixed to the push rod of the hydraulic support connected to the single-section scraper conveyor, and the connection point is briefly described as an oil-rod fixing point, and the middle groove of the single-section scraper conveyor is hinged and fixed with the push rod of the hydraulic support, and the connection point is briefly described as the groove-rod fixing point; thus, the oil-groove fixing point, the oil-rod fixing point, the groove-rod fixing point, the length of the push rod of the digital oil cylinder for position and attitude regulation of the single-section scraper conveyor, the length of the middle groove between the oil-groove fixing point and the groove-rod fixing point, and the length of the push rod of the hydraulic support between the oil-rod fixing point and the groove-rod fixing point, form a triangle.

One side of the triangle is the length of the push rod of the digital oil cylinder for position and attitude regulation of the single-section scraper conveyor, and the length of the push rod of the digital oil cylinder for position and attitude regulation of the single-section scraper conveyor can be changed; the calculation method of the elevation angle of the middle groove of the single-section scraper conveyor relative to the horizontal plane where the push rod of the hydraulic support is located is:

Assuming that the length of the middle groove between the oil-groove fixing point and the groove-rod fixing point is y, the length of the push rod between the oil-rod fixing point and the groove-rod fixing point is z, and the length of the push rod of the digital oil cylinder for position and attitude regulation of the single-section scraper conveyor is x, the elevation angle of the middle groove of the single-section scraper conveyor relative to the horizontal plane where the push rod of the hydraulic support is located is θ, the angle of the middle groove of the single-section scraper conveyor relative to the base of the single-section scraper conveyor is 90°. Therefore, according to the cosine theorem, the elevation angle θ of the middle groove of the single-section scraper conveyor relative to the horizontal plane where the push rod of the hydraulic support is located can be indirectly calculated as:

$$\theta = 90° - \theta' = 90° - acrcos\left(\frac{y^2 + z^2 - x^2}{2yz}\right) \quad (2)$$

In the second aspect, the method for detecting full-length fluctuation state of a scraper conveyor in a fully mechanized mining face provided by the embodiment of the present invention includes the following steps:

Step S1: use the displacement detection module of the digital oil cylinder for position and attitude regulation of the single-section scraper conveyor, to measure the telescopic length x of the piston rod of the digital oil cylinder;

Step S2: Detect the elevation angle α of the push rod of the hydraulic support through the proximity switch trigger module of the hydraulic support's base;

Step S3: Detect the telescopic length x of the piston rod of the digital oil cylinder through the displacement detection module of the digital oil cylinder for position and attitude regulation of the single-section scraper conveyor, and use the relationship between the elevation angle θ of the middle groove of the single-section scraper conveyor relative to the horizontal plane where the push rod of the hydraulic support is located and the telescopic length x of the piston rod of the digital oil cylinder shown in formula (2), to obtain the elevation angle θ of the middle groove of the single-section scraper conveyor relative to the horizontal plane where the push rod of the hydraulic support is located;

Step S4: obtain the floating angle β=θ+a of the middle groove of the single-section scraper conveyor relative to the bottom plate of the working face;

Step S5: According to the floating angle β of the middle groove of the single-section scraper conveyor relative to the bottom plate of the working face, draw the fluctuation state curve of the entire length of the scraper conveyor in the entire working face.

Optionally, the method for detecting the full-length fluctuation state of a fully mechanized mining face scraper conveyor provided by the embodiment of the present invention includes the following steps:

Step S1: use the displacement detection module of the digital oil cylinder for position and attitude regulation of the single-section scraper conveyor, to measure the telescopic length x of the piston rod of the digital oil cylinder;

Step S2: measure the elevation angle α of the push rod of the hydraulic support through the proximity switch trigger module of the hydraulic support's base;

Step S3: Detect the telescopic length x of the piston rod of the digital oil cylinder through the displacement detection module of the digital oil cylinder for position and attitude regulation of the single-section scraper conveyor, and use the mathematical relationship between the elevation angle θ of the middle groove of the single-section scraper conveyor relative to the horizontal plane where the push rod of the hydraulic support is located and the telescopic length x of the piston rod of the digital oil cylinder derived by the present invention, to obtain the elevation angle θ of the middle groove of the single-section scraper conveyor relative to the horizontal plane where the push rod of the hydraulic support is located;

Step S4: Calculate the floating angle β=θ+α of the middle groove of the single-section scraper conveyor relative to the bottom plate of the working face;

Step S5: According to floating angle β of the middle groove of each section of the scraper conveyor in the working face relative to the bottom plate of the working face, draw the fluctuation state curve of the entire length of the scraper conveyor in the entire working face.

Technical effects and advantages of the present invention: The system and method for detecting the full-length fluctuation state of the scraper conveyor in a fully mechanized mining face provided by the present invention does not need to set up a large number of sensors, and is completely based on the existing proximity switch of the hydraulic support's base and the digital oil cylinder for position and attitude regulation of the single-section scraper conveyor, can monitor the full-length fluctuation state of the scraper conveyor effectively in real time at low cost and high efficiency, so as to obtain the fluctuation state of the working face, ensure its normal operation, and provide important data support for the subsequent improvement of the straightness and smoothness of the working face and the adjustment of the propulsion pitch angle of the working face.

In the figure, 500 is the base of the hydraulic support; 501 is the push rod of the hydraulic support; 502 is the middle groove of the single-section scraper conveyor; 201 is the digital oil cylinder for position and attitude regulation of the single-section scraper conveyor; D1 is the connection point of the digital cylinder and the middle groove; D2 is the connection point of the push rod of the hydraulic support and the digital cylinder; D3 is the connection point of the push rod of the hydraulic support and the middle groove; a is the elevation angle of the push rod of the hydraulic support relative to the bottom plate of the working face; θ is the elevation angle of the middle groove of the single-section scraper conveyor relative to the horizontal plane where the push rod of the hydraulic support is located; B is the undulating angle of the middle groove of the single-section scraper conveyor relative to the bottom plate of the working surface; 101 is the proximity switch of the hydraulic support's base; 102 is the internal trigger device; 202 is the piston rod detection device of the digital oil cylinder for position and attitude regulation of the single-section scraper conveyor; 503 is the piston rod of the hydraulic support's push jack.

DETAILED DESCRIPTION

The technical solutions in the embodiments of the present invention will be clearly and completely described below with reference to the accompanying drawings in the embodiments of the present invention. Obviously, the described embodiments are only a part of the embodiments of the present invention, but not all of the embodiments. Based on the embodiments of the present invention, all other embodiments obtained by those of ordinary skill in the art without creative efforts shall fall within the protection scope of the present invention.

Figure 1:
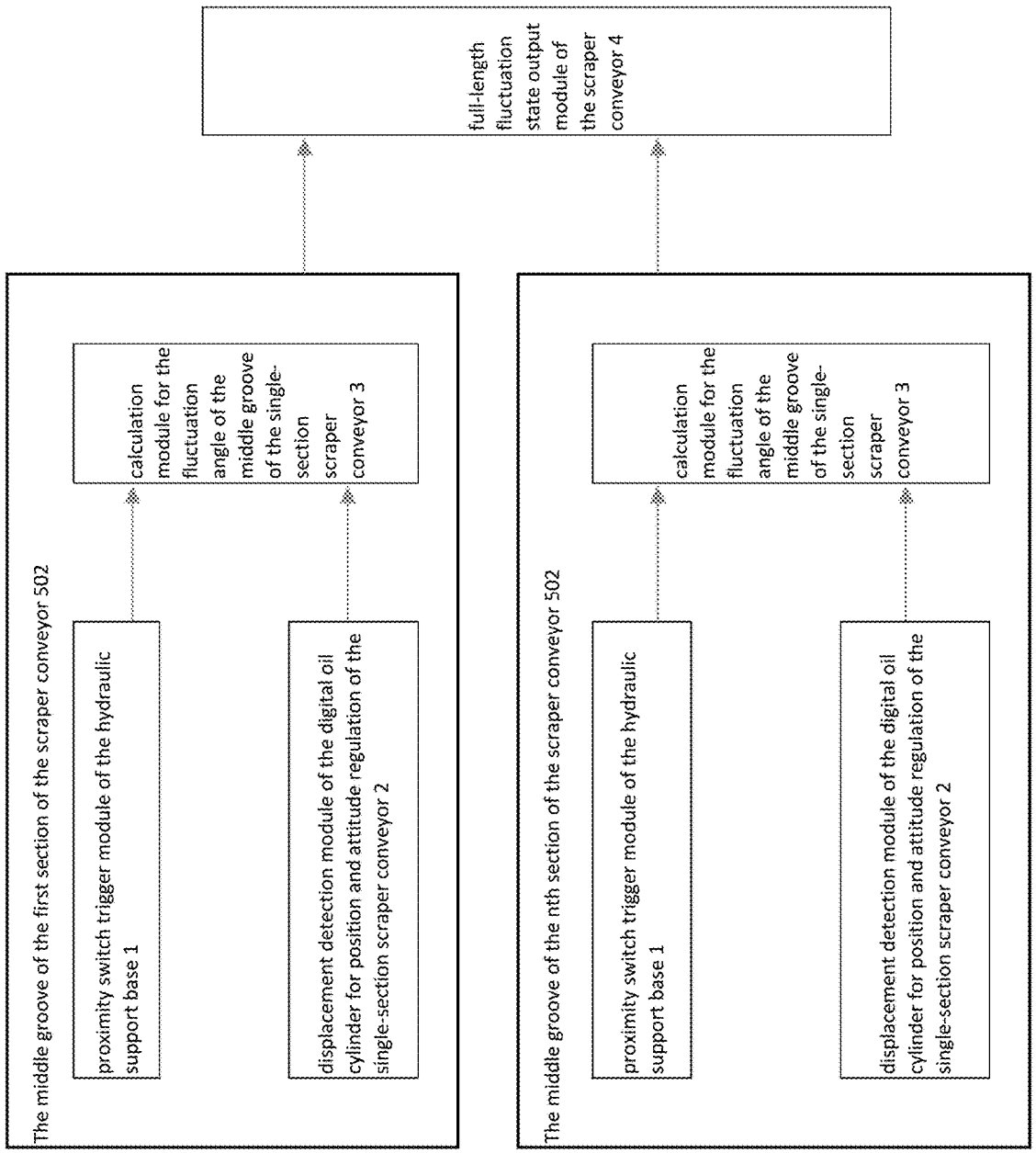
FIG. 1 is a schematic diagram of a system for detecting full-length fluctuation state of a scraper conveyor in a fully mechanized mining face of the present invention.

A system for detecting the full-length fluctuation state of the scraper conveyor in a fully mechanized mining face according to the present invention, as shown in FIG. 1, a proximity switch trigger module 1 of the hydraulic support's base, a displacement detection module 2 of the digital oil cylinder for position and attitude regulation of the single-section scraper conveyor, a calculation module 3 for the fluctuation angle of the middle groove of the single-section scraper conveyor and a full-length fluctuation state output module 4 of the scraper conveyor;

The proximity switch trigger module 1 of the hydraulic support's base includes proximity switch 101 of the hydraulic support's base and an internal trigger device 102, and is installed inside the hydraulic support's base 500. One end of the push rod 501 of the hydraulic support is connected with the middle groove 502 of the single-section scraper conveyor, and the other end is connected with the piston rod 503 of the hydraulic support's push jack. When the push rod 501 of the hydraulic support is displaced upward to the proximity switch 101 of the hydraulic support's base due to the reaction force of the middle groove 502 of the single-section scraper conveyor, the internal trigger device 102 generates a pulse signal, at this time, the push rod 501 of the hydraulic support is stuck by the proximity switch 101 of the hydraulic support's base and will not shift upwards. The elevation angle α of the push rod 501 of the hydraulic support can be determined according to whether the push rod 501 of the hydraulic support is shifted upward to the proximity switch 101 of the hydraulic support's base.

The displacement detection module 2 of the digital oil cylinder for position and attitude regulation of the single-section scraper conveyor, includes a digital oil cylinder 201 for position and attitude regulation of the single-section scraper conveyor and its internal piston rod detection device 202, and is used to detect the telescopic amount of the piston rod of the digital oil cylinder for position and attitude regulation of the single-section scraper conveyor;

The calculation module 3 for the fluctuation angle of the middle groove of the single-section scraper conveyor calculates the fluctuation angle β of the middle groove 502 of the single-section scraper conveyor by using the telescopic amount x of the rod and the elevation angle α of the push rod 501 of the hydraulic support measured by the piston rod detection device 202 of the digital oil cylinder for position and attitude regulation of the single-section scraper conveyor;

The full-length fluctuation state output module 4 of the scraper conveyor is based on the output of the calculation module 3 for the fluctuation angle of the middle groove of each single-section scraper conveyor, and draws the full-length fluctuation curve of the scraper conveyor in the entire working face, and outputs it to the display for display.

The system for detecting full-length fluctuation state of a scraper conveyor in the fully mechanized mining face provided by the invention does not need to set up a large number of sensors, and is completely based on the existing proximity switch of the hydraulic support's base and the digital oil cylinder for position and attitude regulation of the single-section scraper conveyor, can monitor the fluctuation state of the entire length of the scraper conveyor effectively in real time at low cost and high efficiency, so as to obtain the fluctuation state of the working face, ensure its normal operation, and provide important data support for the subsequent improvement of the straightness and smoothness of the working face and the adjustment of the propulsion pitch angle of the working face.

The elevation angle of the push rod 501 of the hydraulic support in the proximity switch trigger module 1 of the hydraulic support's base can be determined according to whether the push rod 501 of the hydraulic support is displaced upward to the proximity switch 101 of the hydraulic support's base: assuming that the push rod 501 of the hydraulic support is horizontal, the distance between the push rod 501 of the hydraulic support and the horizontal proximity switch 101 of the hydraulic support's base is h, and the distance between the vertical plane where the proximity switch 101 of the hydraulic support's base is located and the vertical plane where the connection point of the push rod 501 of the hydraulic support and the hydraulic support's push jack 503 is located is s, then the elevation angle α of the push rod 501 of the hydraulic support can be determined according to whether the push rod 501 of the hydraulic support is displaced upward to the proximity switch 101 of the hydraulic support's base: when the push rod 501 of the hydraulic support is shifted upward to the proximity switch 101 of the hydraulic support's base, the elevation angle of the push rod 501 of the hydraulic support is $$\alpha = acr\tan\left(\frac{h}{s}\right);$$

When the push rod 501 of the hydraulic support is shifted upward and does not reach the proximity switch 101 of the hydraulic support's base or is not shifted upward, the elevation angle of the push rod 501 of the hydraulic support is α=0°.

The fluctuation angle of the middle groove of the single-section scraper conveyor can be obtained indirectly through the formula of the triangular cosine theorem. Determination of the triangle: one end of the digital cylinder 201 for position and attitude regulation of the single-section scraper conveyor is welded and fixed to the middle groove 502 of the single-section scraper conveyor, and the connection point is briefly described as the oil-groove fixing point D1. The other end of the digital cylinder 201 for position and attitude regulation of the single-section scraper conveyor is welded and fixed to the push rod 501 of the hydraulic support connected to the single-section scraper conveyor. The connection point is briefly described as the oil-rod fixing point D2. The middle groove 502 of the single-section scraper conveyor is connected to the push rod 501 of the hydraulic support, and the connection point is briefly described as the groove-rod fixing point D3; thus, the oil-groove fixing point D1, the oil-rod fixing point D2, the groove-rod fixing point D3, The length of the push rod of the digital cylinder 201 for position and attitude regulation of the single-section scraper conveyor, the length of the middle groove 502 between the oil-groove fixing point D1 and the groove-rod fixing point D3, and the length of the push rod 501 of the support hydraulic between the oil-rod fixing point D2 and the groove-rod fixing point D3, form a triangle;

One side of the triangle is the length of the push rod measured by the piston rod detection device 202 of the digital oil cylinder for position and attitude regulation of the single-section scraper conveyor. Therefore, the calculation method of the elevation angle of the middle groove 502 of the single-section scraper conveyor relative to the horizontal plane where the push rod 501 of the support hydraulic is located is:

Assuming that the length of the middle groove between the oil-groove fixing point D1 and the groove-rod fixing point D3 is y, the length of the push rod between the oil-rod fixing point D2 and the groove-rod fixing point D3 is z, the length of the push rod of the digital cylinder 201 for position and attitude regulation of the single-section scraper conveyor is x, and the elevation angle of the middle groove 502 of the single-section scraper conveyor relative to the horizontal plane where the push rod 501 of the support hydraulic is located is θ, the middle groove 502 of the single-section scraper conveyor is 90° from the base of the single-section scraper conveyor. Therefore, the elevation angle θ of the middle groove 502 of the single-section scraper conveyor relative to the horizontal plane where the push rod 501 of the support hydraulic is located can be calculated according to the cosine theorem:

$$\theta = 90° - \theta' = 90° - arccos\left(\frac{y^2 + z^2 - x^2}{2yz}\right).$$

Therefore, the elevation angle θ of the middle groove 502 of the single-section scraper conveyor relative to the horizontal plane where the push rod 501 of the support hydraulic is located can be obtained by detecting the length x of the push rod measured by the piston rod detection device 202 of the digital oil cylinder for position and attitude regulation of the single-section scraper conveyor and then calculating indirectly.

Figure 2:
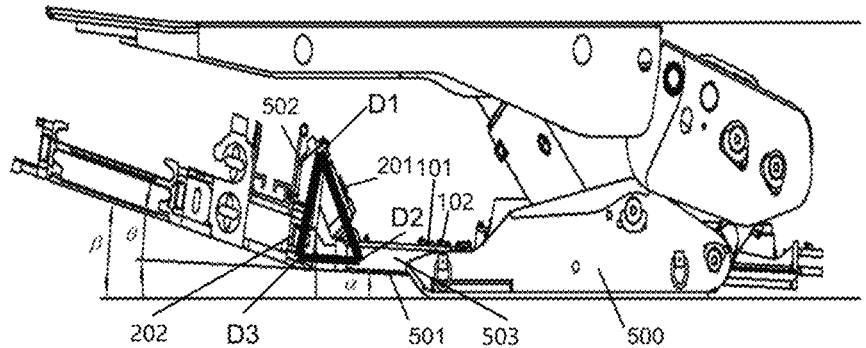
FIG. 2 is a schematic diagram of calculation of the fluctuation angle calculation module of the middle groove of the single-section scraper conveyor in the system for detecting the full-length fluctuation state of the scraper conveyor in a fully mechanized mining face of the present invention.
Figure 3:
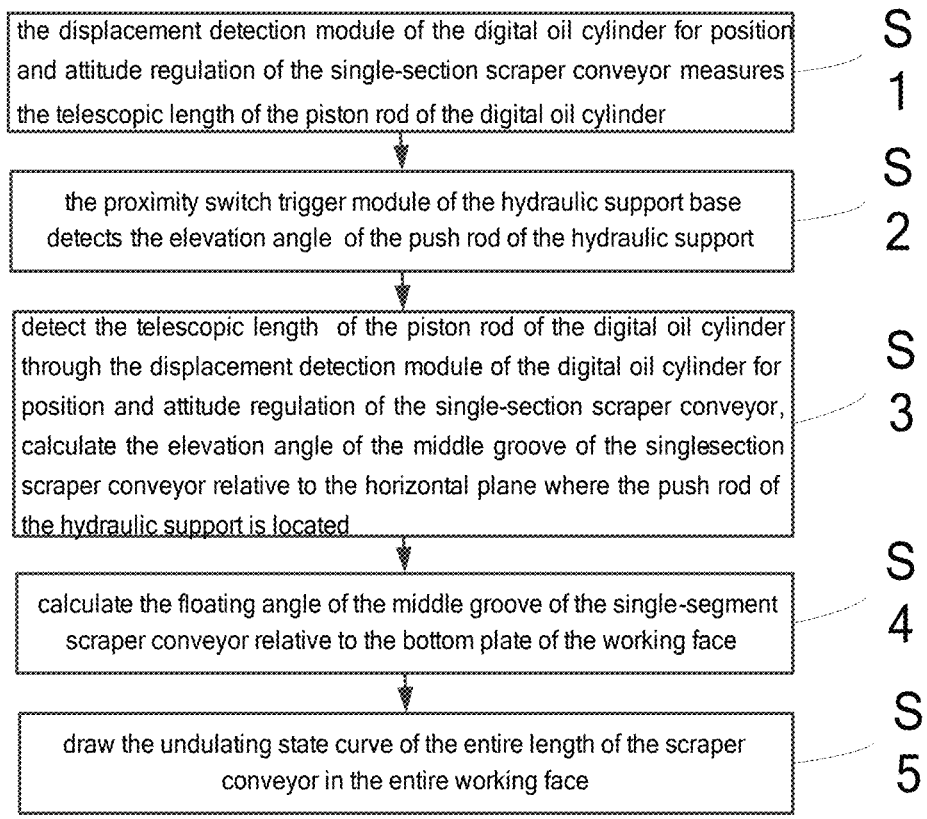
FIG. 3 is a schematic flow chart of the method for detecting full-length fluctuation state of a scraper conveyor in a fully mechanized mining face of the present invention.

The method for detecting the full-length fluctuation state of the scraper conveyor in the fully mechanized mining face, as shown in FIG. 2, includes the following steps:

Step S1: Weld and fix the digital oil cylinder 201 somewhere in the middle groove 502 of the single-section scraper conveyor and somewhere in the push rod 501 of the hydraulic support, the oil cylinder 201 has a piston rod displacement detection device 202 inside, and uses the displacement detection module 2 of digital oil cylinder for position and attitude regulation of the single-section scraper conveyor to measure the length of the piston rod of the digital oil cylinder 201;

Step S2: Detect the elevation angle α of the push rod 501 of the hydraulic support through the proximity switch 101 of the hydraulic support's base and the internal trigger device 102;

Step S3: Through the telescopic length of the piston rod of the oil cylinder 201 detected by the piston rod detection device 202 of the digital oil cylinder for position and attitude regulation of the single-section scraper conveyor, use the mathematical relationship between the elevation angle θ of the middle groove 502 of the single-section scraper conveyor relative to the horizontal plane where the push rod 501 of the hydraulic support is located and the telescopic length x of the piston rod of the digital oil cylinder 201, the elevation angle θ of the middle groove 502 of the single-section scraper conveyor relative to the horizontal plane where the push rod 501 of the hydraulic support is located is obtained;

Step S4: obtain the floating angle β=θ+α of the middle groove 502 of the single-section scraper conveyor relative to the bottom plate of the working face;

Step S5: According to the floating angle β of the middle groove 502 of the single-section scraper conveyor relative to the bottom plate of the working face, draw the fluctuation state curve of the entire length of the scraper conveyor in the entire working face.

As can be seen from the above description, the system and method for detecting the full-length fluctuation state of a scraper conveyor in a fully mechanized mining face provided by the embodiment of the present invention does not need to set up a large number of sensors, and is completely based on the existing proximity switch of the hydraulic support's base and the digital oil cylinder for position and attitude regulation of the single-section scraper conveyor, and can effectively monitor the dynamic fluctuations of the scraper conveyor on the vertical working surface in real time, ensure its normal operation, and provide data feedback for the subsequent straightness control of the scraper conveyor.

The above descriptions are only the preferred implementation of the present invention, and are not intended to limit the present invention. Although the present invention has been described in detail with reference to the foregoing embodiments, those skilled in the art can still modify the technical solution recorded in the foregoing embodiments or equivalently replace some technical features thereof. Any modification, equivalent replacement, improvement, etc. made within the spirit and principle of the present invention shall be included in the protection scope of the present invention.

The invention claimed is:

1. A system for detecting a full-length fluctuation state of a scraper conveyor in a fully mechanized mining face, comprising: a proximity switch trigger module of a hydraulic support's base;

a displacement detection module of a digital oil cylinder for position and attitude regulation of a single-section scraper conveyor, a calculation module for a fluctuation angle of a middle groove of the single-section scraper conveyor and an output module of the full-length fluctuation state of the scraper conveyor;

wherein the proximity switch trigger module of the hydraulic support's base includes a proximity switch of the hydraulic support's base and a trigger device, and is used to detect an elevation angle of a push rod of the hydraulic support;

wherein the displacement detection module of the digital oil cylinder for position and attitude regulation of the single-section scraper conveyor includes a digital oil cylinder for position and attitude regulation of the single-section scraper conveyor and its internal piston rod detection device, and is used to detect the telescopic amount of the piston rod of the digital oil cylinder for position and attitude regulation of the single-section scraper conveyor;

wherein the calculation module for the fluctuation angle of the middle groove of the single-section scraper conveyor is to calculate the fluctuation angle of the middle groove of the single-section scraper conveyor by using a displacement detection value of the digital oil cylinder for position and attitude regulation of the single-section scraper conveyor and the elevation angle of the push rod of the hydraulic support;

wherein the full-length fluctuation state output module of the scraper conveyor draws a full-length fluctuation curve of the scraper conveyor in an entire working face according to the obtained fluctuation angle of the middle groove of the single-section scraper conveyor, and outputs it to a display for display.

2. The detection system according to claim 1, wherein the proximity switch trigger module of the hydraulic support's base is used to detect the elevation angle of the push rod of the hydraulic support, specifically: the proximity switch trigger module of the hydraulic support's base, includes the proximity switch of the hydraulic support's base and internal triggering device, is installed inside the hydraulic support's base, at a certain position above when the push rod of the hydraulic support is horizontal; one end of the push rod of the hydraulic support is connected to the middle groove of the single-section scraper conveyor and the other end is connected with a piston rod of the hydraulic support's push jack; when the push rod of the hydraulic support is displaced upward due to the force of the middle groove of the single-section scraper conveyor, after the push rod of the hydraulic support is moved upward to the proximity switch of the hydraulic support's base, the trigger device generates a pulse, and at this time, the push rod of the hydraulic support is stuck by the proximity switch and will not continue to shift upward; therefore, the elevation angle of the hydraulic support push rod depends on whether the push rod of the hydraulic support is shifted upward to the proximity switch of the hydraulic support's base;

wherein the distance between the proximity switch of the hydraulic support's base and the push rod of the hydraulic support when the push rod of the hydraulic support is horizontal is h, the distance between the plane where the proximity switch of the hydraulic support's base is located and the plane where the connection point of the push rod of the hydraulic support and the hydraulic support's push jack is located is s, and the elevation angle of the push rod of the hydraulic support can be determined according to whether the push rod of the hydraulic support is shifted upward to the proximity switch of the hydraulic support's base, that is, when the push rod of the hydraulic support is shifted upward to the proximity switch of the hydraulic support's base, the elevation angle of the push rod of the hydraulic support is $$\alpha = \alpha_{max} = acr\tan\left(\frac{h}{s}\right);$$

When the push rod of the hydraulic support is shifted upward and does not reach the proximity switch of the hydraulic support's base or is not shifted upward, the elevation angle of the push rod of the hydraulic support is $\alpha=0°$.

3. The detection system according to claim 1, wherein the fluctuation angle of the single-section scraper conveyor is obtained indirectly by using the triangular cosine theorem formula.

4. The detection system according to claim 3, wherein the determination of a triangle: one end of the digital oil cylinder for position and attitude regulation of the single-section scraper conveyor is welded and fixed to the middle groove of the single-section scraper conveyor, which can be considered as an oil-groove fixing point, and the other end is welded and fixed to the push rod of the hydraulic support connected by the single-section scraper conveyor, which can be considered as an oil-rod fixing point, and the middle groove connection of the single-section scraper conveyor is hinged and fixed with the push rod of the hydraulic support, which can be considered as a groove-rod fixing point; thus, the oil-groove fixing point, the oil-rod fixing point, the groove-rod fixing point, the length of the push rod of the digital oil cylinder for position and attitude regulation of the single-section scraper conveyor, the length of the middle groove between the oil-groove fixing point and the groove-rod fixing point, and the length of the push rod of the hydraulic support between the oil-rod fixing point and the groove-rod fixing point, form a triangle;

wherein one side of the triangle is the length of the push rod of the digital oil cylinder for position and attitude regulation of the single-section scraper conveyor, and the length can be changed; the elevation angle θ of the middle groove of the single-section scraper conveyor relative to the horizontal plane where the push rod of the hydraulic support is located is $$\theta = 90° - \theta' = 90° - acr\cos\left(\frac{y^2 + z^2 - x^2}{2yz}\right).$$

x is a telescopic length of the piston rod of the digital oil cylinder, y is a length of the middle groove between the oil-groove fixing point and the groove-rod fixing point, z is a length of the push rod of the hydraulic support between the oil-rod fixing point and the groove-rod fixing point.

5. A method for detecting a full-length fluctuation state of a scraper conveyor in a fully mechanized mining face, characterized in that it comprises the following steps:

Step S1: use a displacement detection module of a digital oil cylinder for position and attitude regulation of a single-section scraper conveyor, to measure a telescopic length x of a piston rod of the digital oil cylinder;

Step S2: measure an elevation angle α of a push rod of a hydraulic support through the proximity switch trigger module of the hydraulic support's base;

Step S3: Detect the telescopic length x of the piston rod of the digital oil cylinder through the displacement detection module of the digital oil cylinder for position and attitude regulation of the single-section scraper conveyor, and use the mathematical relationship between the elevation angle θ of a middle groove of the single-section scraper conveyor relative to the horizontal plane where the push rod of the hydraulic support is located and the telescopic length x of the piston rod of the digital oil cylinder, to obtain the elevation angle θ of the middle groove of the single-section scraper conveyor relative to the horizontal plane where the push rod of the hydraulic support is located;

Step S4: Calculate the floating angle β=θ+α of the middle groove of the single-section scraper conveyor relative to the bottom plate of a working face;

Step S5: According to the floating angle β of the middle groove of each section of the scraper conveyor in the working face relative to the bottom plate of the working face, draw the undulating state curve of the entire length of the scraper conveyor in the entire working face.

6. The detection method according to claim 5, wherein the proximity switch trigger module of the hydraulic support's base is used to detect the elevation angle of the push rod of the hydraulic support, specifically: the proximity switch trigger module of the hydraulic support's base includes a proximity switch of the hydraulic support's base and an internal trigger device, installed inside the hydraulic support's base, at a certain position above when the push rod of the hydraulic support is horizontal; one end of the push rod of the hydraulic support is connected to the middle groove of the single-section scraper conveyor, and the other end is connected with a piston rod of the hydraulic support's push jack; when the push rod of the hydraulic support is displaced upward due to the force of the middle groove of the single-section scraper conveyor, after the push rod of the hydraulic support is shifted upward to the proximity switch of the hydraulic support's base, the trigger device generates a pulse, and at this time, the push rod of the hydraulic support is stuck by the proximity switch and will not continue to shift upward; therefore, the elevation angle of the push rod of the hydraulic support depends on whether the push rod of the hydraulic support is shifted upward to the proximity switch of the hydraulic support's base;

wherein distance between the proximity switch of the hydraulic support's base and the push rod of the hydraulic support when the push rod of the hydraulic support is horizontal is h, the distance between the plane where the proximity switch of the hydraulic support's base is located and the plane where the connection point of the push rod of the hydraulic support and the hydraulic support's push jack is located is s, and the elevation angle of the push rod of the hydraulic support can be determined according to whether the push rod of the hydraulic support is shifted upward to the proximity switch of the hydraulic support's base, that is, when the push rod of the hydraulic support is shifted upward to the proximity switch of the hydraulic support's base, the elevation angle of the push rod of the hydraulic support is $$\alpha = \alpha_{max} = ac r\tan\left(\frac{h}{s}\right);$$

When the push rod of the hydraulic support is shifted upward and does not reach the proximity switch of the hydraulic support's base or is not shifted upward, the elevation angle of the push rod of the hydraulic support is α=0°.

7. The detection method according to claim 5, wherein a fluctuation angle of the single-section scraper conveyor is obtained indirectly by using the triangular cosine theorem formula.

8. The detection method according to claim 7, characterized in that, the determination of a triangle: one end of the digital oil cylinder for position and attitude regulation of the single-section scraper conveyor is welded and fixed to the middle groove of the single-section scraper conveyor, which can be considered as an oil-groove fixing point, and the other end is welded and fixed to the push rod of the hydraulic support connected to the single-section scraper conveyor, which can be considered as an oil-rod fixing point, and the middle groove connection of the single-section scraper conveyor is hinged and fixed with the push rod of the hydraulic support, which can be considered as a groove-rod fixing point; thus, the oil-groove fixing point, the oil-rod fixing point, the groove-rod fixing point, the length of the push rod of the digital oil cylinder for position and attitude regulation of the single-section scraper conveyor, the length of the middle groove between the oil-groove fixing point and the groove-rod fixing point, and the length of the push rod of the hydraulic support between the oil-rod fixing point and the groove-rod fixing point, form a triangle;

wherein one side of the triangle is the length of the push rod of the digital oil cylinder for position and attitude regulation of the single-section scraper conveyor, and the length can be changed; the elevation angle θ of the middle groove of the single-section scraper conveyor relative to the horizontal plane where the push rod of the hydraulic support is located is $$\theta = 90° - \theta' = 90° - ac r\cos\left(\frac{y^2 + z^2 - x^2}{2yz}\right).$$

x is the telescopic length of the piston rod of the digital oil cylinder, y is a length of the middle groove between the oil-groove fixing point and the groove-rod fixing point, z is a length of the push rod of the hydraulic support between the oil-rod fixing point and the groove-rod fixing point.

* * * * *